United States Patent
Jackson et al.

(10) Patent No.: US 12,511,504 B2
(45) Date of Patent: Dec. 30, 2025

(54) CAMERA ENABLED PORTAL

(71) Applicant: Rehrig Pacific Company, Los Angeles, CA (US)

(72) Inventors: Peter Douglas Jackson, Alpharetta, GA (US); Jason Crawford Miller, Bedford, TX (US); Hisham Khalid A. Alshmmasi, Frisco, TX (US); Matthew Smith, Fenton, MI (US)

(73) Assignee: Rehrig Pacific Company, Monterey Park, CA (US)

( * ) Notice: Subject to any disclaimer, the term of this patent is extended or adjusted under 35 U.S.C. 154(b) by 0 days.

(21) Appl. No.: 18/396,090

(22) Filed: Dec. 26, 2023

(65) Prior Publication Data

US 2024/0127012 A1   Apr. 18, 2024

Related U.S. Application Data

(63) Continuation of application No. 17/234,922, filed on Apr. 20, 2021, now Pat. No. 11,922,253.

(60) Provisional application No. 63/012,669, filed on Apr. 20, 2020.

(51) Int. Cl.
    *G06K 7/10*      (2006.01)
    *G06K 19/07*     (2006.01)
    *G06V 20/52*     (2022.01)
    *H04N 23/66*     (2023.01)

(52) U.S. Cl.
    CPC ..... *G06K 7/10366* (2013.01); *G06K 19/0723* (2013.01); *G06V 20/52* (2022.01); *H04N 23/66* (2023.01)

(58) Field of Classification Search
    CPC . G06K 7/10366; G06K 19/0723; G06V 20/52
    USPC .......................................................... 235/451
    See application file for complete search history.

(56) References Cited

U.S. PATENT DOCUMENTS

| | | | |
|---|---|---|---|
| 9,826,213 B1 * | 11/2017 | Russell | B65G 69/00 |
| 11,922,253 B2 * | 3/2024 | Jackson | G06K 7/10366 |
| 2013/0063567 A1 * | 3/2013 | Burns | G08B 13/248 348/46 |
| 2021/0326544 A1 * | 10/2021 | Jackson | G06K 7/10445 |
| 2021/0374659 A1 | 12/2021 | Ganapathi et al. | |

(Continued)

OTHER PUBLICATIONS

Decision on Appeal for U.S. Appl. No. 17/508,021 dated Nov. 20, 2024.

*Primary Examiner* — Ahshik Kim
(74) *Attorney, Agent, or Firm* — Carlson, Gaskey & Olds, P.C.

(57) ABSTRACT

A delivery portal, which may be at a loading dock, includes a sensor configured to detect a pallet, platform or stack of goods as it passes through the portal. A computer is programmed to receive information from the sensor and to identify the pallet based upon the information. The computer is further programmed to compare the identified pallet to a database to determine if the identified pallet should be passing through the portal. For example, the computer determines whether the pallet is being loaded onto the wrong truck or onto the right truck but in the wrong sequence. The sensor for detecting the pallet may be an RFID sensor reading an RFID tag on the pallets. The portal may be a loading dock. The database may indicate a sequence for loading a plurality of pallets including the identified pallet onto a truck at the loading dock.

24 Claims, 12 Drawing Sheets

(56) References Cited

U.S. PATENT DOCUMENTS

| | | |
|---|---|---|
| 2022/0299995 A1 | 9/2022 | Ganapathi et al. |
| 2024/0169311 A1 | 5/2024 | Neema et al. |

* cited by examiner

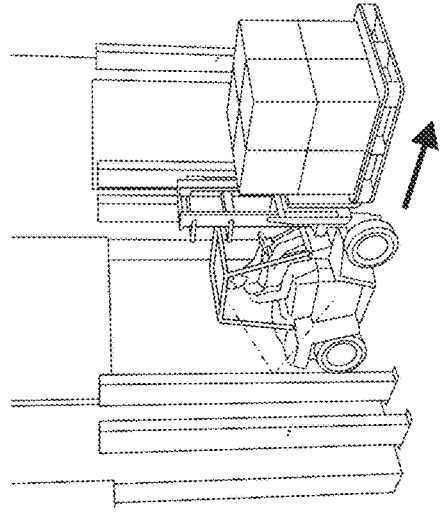
FIG. 18
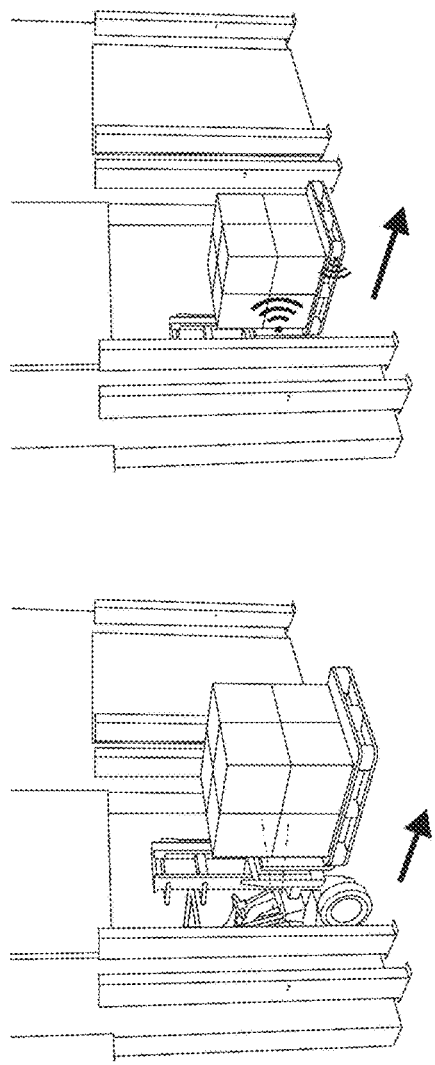
FIG. 17
FIG. 16
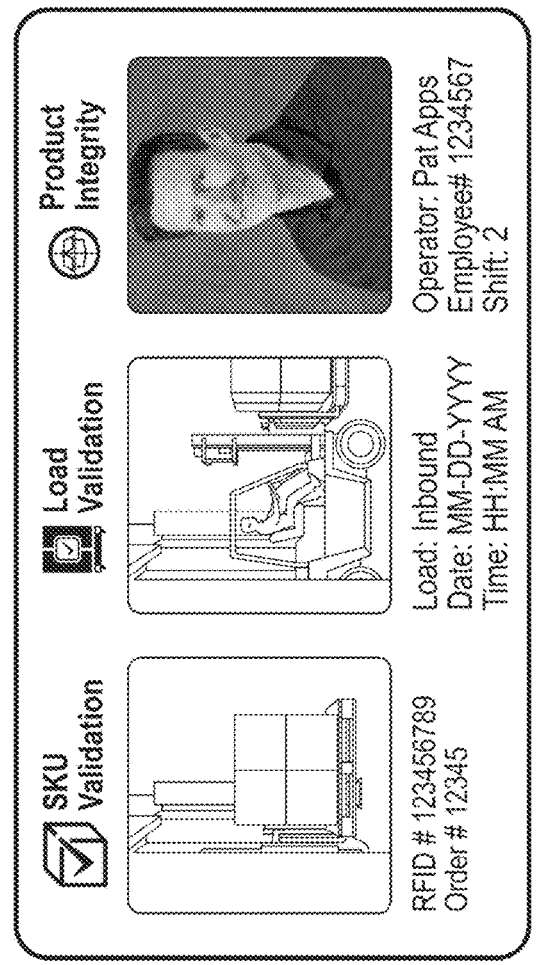
FIG. 19

CAMERA ENABLED PORTAL

This application is a continuation of U.S. application Ser. No. 17/234,922, now U.S. Pat. No. 11,922,253, filed on Apr. 20, 2021, which claims benefit of U.S. provisional application 63/012,669 filed on Apr. 20, 2020.

BACKGROUND

A truck leaving a distribution center may contain numerous pallets each loaded with goods. One or more of the loaded pallets may be required to be delivered to each of a plurality of stores. Attempts are made to load the truck in reverse-sequence, that is, loading the last-to-be-delivered first. Loading the pallets in the wrong sequence can reduce efficiency. Loading pallets into the wrong truck can significantly reduce efficiency.

SUMMARY

A delivery portal, which may be at a loading dock, includes a sensor configured to detect a pallet, platform or stack of goods as it passes through the portal. A computer is programmed to receive information from the sensor and to identify the pallet based upon the information. The computer is further programmed to compare the identified pallet to a database to determine if the identified pallet should be passing through the portal. For example, the computer determines whether the pallet is being loaded onto the wrong truck or onto the right truck but in the wrong sequence.

The sensor for detecting the pallet may be an RFID sensor reading an RFID tag on the pallets. The portal may be a loading dock.

The database may indicate a sequence for loading a plurality of pallets including the identified pallet onto a truck at the loading dock.

The delivery portal may also include a camera and the computer may be programmed to receive images from the camera. The computer may also be programmed to identify a person moving the pallet through the portal, such as via facial recognition based on the image from the camera.

The computer may be programmed to determine a direction of travel of the pallet through the portal. The computer may determine the direction of travel based upon information from the camera, such as based upon a plurality of sequential images from the camera. In this manner, the computer can track whether the identified pallet is being moved onto the truck or off of the truck (for example, after it has been noted that a wrong pallet has been moved onto the truck).

The delivery portal may further include a presence sensor. The computer may be programmed to activate the RFID sensor and/or the camera based upon information from the presence sensor. The presence sensor may be a breakbeam sensor or a motion sensor.

Also disclosed herein is a delivery portal sensor tower, which can be used, for example, at a loading dock. The tower may include a housing and an RFID sensor, a camera, and a presence sensor all mounted to the housing. A computer may be in communication with the RFID sensor, the camera and the presence sensor. Based upon an indication of presence by the presence sensor, the computer is programmed to cause the RFID sensor to read an RFID tag and to cause the camera to generate at least one image.

A computerized method for operating a portal is also disclosed herein. A platform carrying a plurality of items stacked thereon is identified near a truck. The identity of the platform is received in computer. The computer compares the identified platform to a list indicating whether the identified platform should be loaded onto the truck. The computer generates an indication whether the identified platform should be loaded onto the truck.

The platform may be a pallet. The list may indicate a sequence of loading a plurality of pallets including the identified pallet. The computer compares the identified pallet to the list to determine whether others of the plurality of pallets on the list should be loaded onto the truck before the identified pallet.

The platform or pallet may be identified by reading an RFID tag on the pallet or platform. The camera may be used to image the platform or pallet and a person moving the platform or pallet. The image may be used to validate the items on the pallet or platform, and may be used to identify the person.

The method may also include determining a direction of movement of the platform relative to the truck, e.g. whether the platform or pallet is being moved onto the truck or off of the truck.

BRIEF DESCRIPTION OF THE DRAWINGS

FIG. 16 shows the breakbeam sensor detecting movement of an inbound loaded pallet.

FIG. 17 shows the RFID sensor recording the RFID tag on the pallet.

FIG. 18 shows the camera imaging the loaded pallet and the driver.

FIG. 19 shows that the system has determined the direction, date/time, pallet id and identification of the driver.

DETAILED DESCRIPTION

Figure 1:
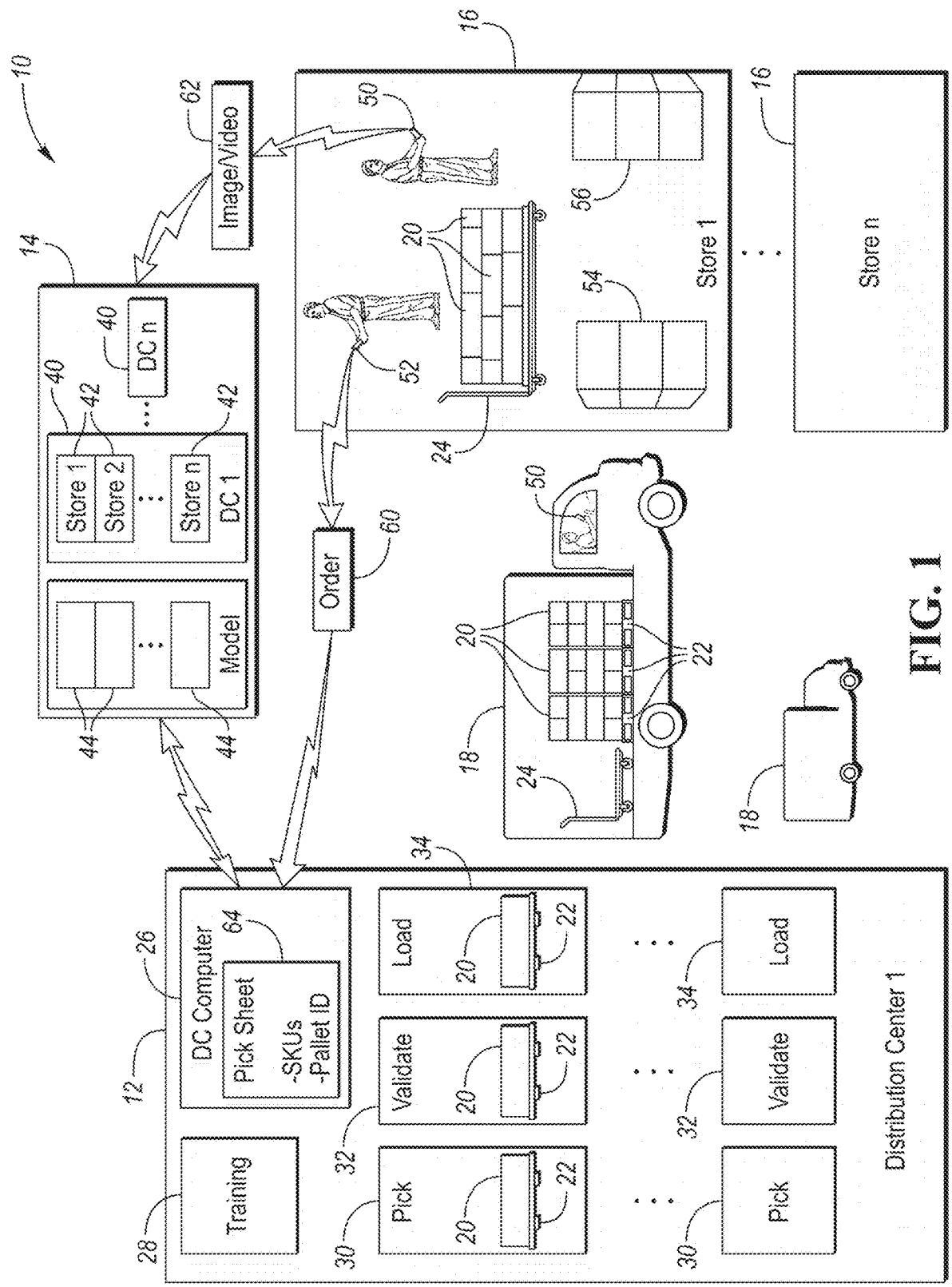
FIG. 1 is a schematic view of a delivery system.

FIG. 1 is a high-level view of a delivery system 10 including one or more distribution centers 12, a central server 14 (e.g. cloud computer), and a plurality of stores 16. A plurality of trucks 18 or other delivery vehicles each transport the products 20 on pallets 22 from one of the distribution centers 12 to a plurality of stores 16. Each truck 18 carries a plurality of pallets 22 which may be half pallets, each loaded with a plurality of goods 20 for delivery to one of the stores 16. A wheeled sled 24 is on each truck 18 to facilitate delivery of one of more pallets 22 of goods 20 to each store 16. Generally, the goods 20 could be loaded on the half pallets 22, full-size pallets, carts, or hand carts, or dollies—all considered "platforms" herein.

Each distribution center 12 includes one or more pick stations 30, a plurality of validation stations 32, and a plurality of loading stations 34. Each loading station may be a loading dock for loading the trucks 18.

Each distribution center 12 includes a DC computer 26. The DC computer 26 receives orders 60 from the stores 16 and communicates with a central server 14. Each DC computer 26 receives orders and generates pick sheets 64, each of which stores SKUs and associates them with pallet ids. Alternatively, the orders 60 can be sent from the DC computer 26 to the central server 14 for generation of the pick sheets 64, which are synced back to the DC computer 26.

Some or all of the distribution centers 12 may include a training station 28 for generating image information and other information about new products 20 which can be transmitted to the central server 14 for analysis and future use.

The central server 14 may include a plurality of distribution center accounts 40, including DC1-DCn, each associated with a distribution center 12. Each DC account 40 includes a plurality of store accounts 42, including store 1-store n. The orders 60 and pick sheets 64 for each store are stored in the associated store account 42. The central server 14 further includes a plurality of machine learning models 44 trained as will be described herein based upon SKUs. The models 44 may be periodically synced to the DC computers 26.

The machine learning models 44 are used to identify SKUs. A "SKU" may be a single variation of a product that is available from the distribution center 12 and can be delivered to one of the stores 16. For example, each SKU may be associated with a particular package type, e.g. the number of containers (e.g. 12 pack) in a particular form (e.g. can pr bottle) and of a particular size (e.g. 24 ounces) with a particular secondary container (cardboard vs reusuable plastic crate, cardboard tray with plastic overwrap, etc). Each machine learning model 44 is trained to identify the possible package types.

Each SKU may also be associated with a particular "brand" (e.g. the manufacturer and the specific flavor). Each machine learning model 44 is trained to identify the possible brands, which are associated with the name of the product, a description of the product, dimensions of the product, and image information for the product. The central server 14 also stores the expected weight of each SKU. It is also possible that more than one variation of a product may share a single SKU, such as where only the packaging, aesthetics, and outward appearance of the product varies, but the content and quantity is the same. For example, sometimes promotional packaging may be utilized, which would have different image information for a particular SKU. In general, all the machine learning models 44 may be generated based upon image information generated through the training module 28.

Figure 2:
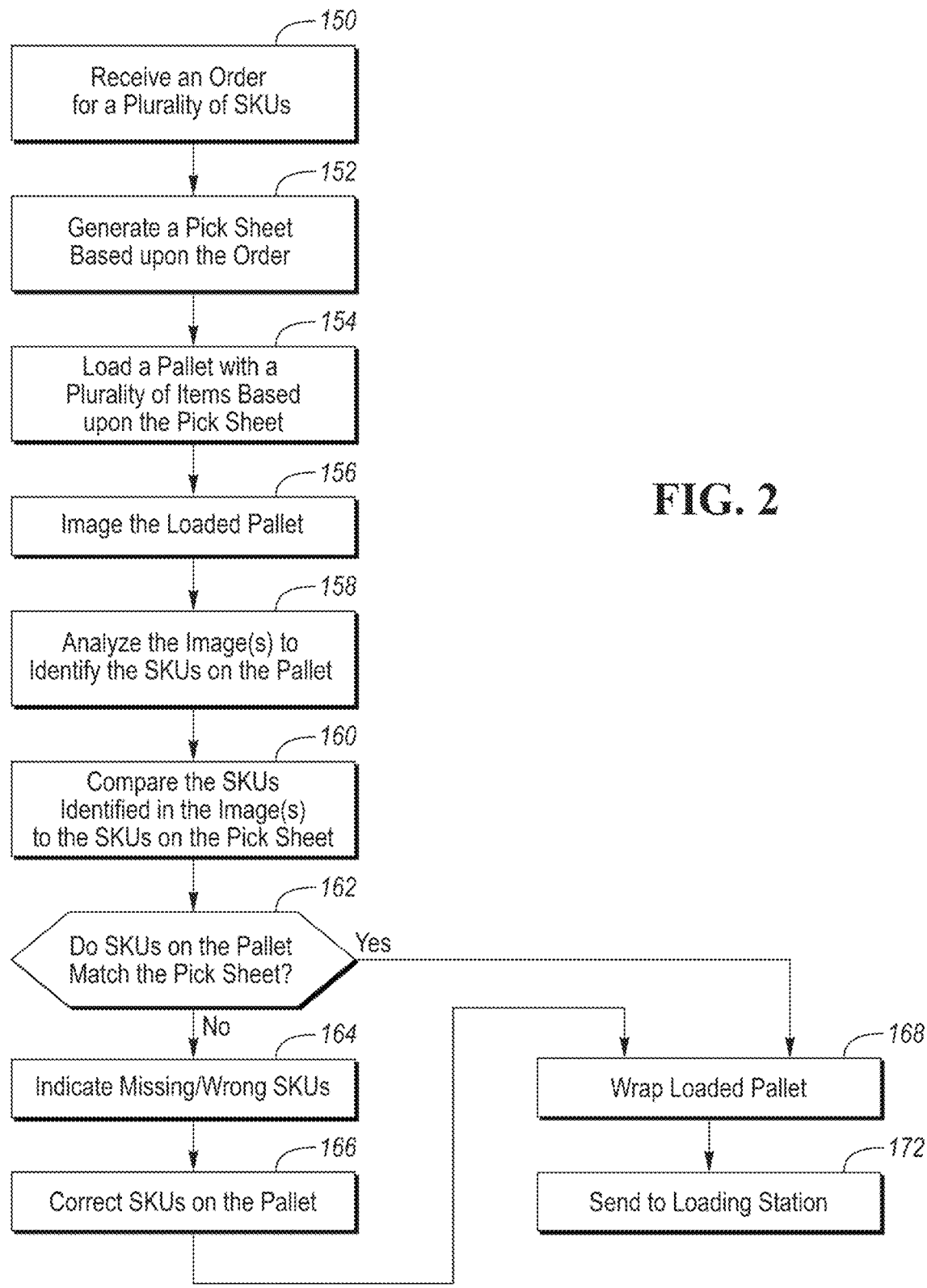
FIG. 2 is a flowchart of one version of a method for assembling items for delivery.

Referring also to the flowchart in FIG. 2, an order 60 may be received from a store 16 in step 150. As an example, an order 60 may be placed by a store employee using an app or mobile device 52. The order 60 is sent to the distribution center computer 26 (or alternatively to the server 14, and then relayed to the proper (e.g. closest) distribution center computer 26). The distribution center computer 26 analyzes the order 60 and creates a pick sheet 64 associated with that order 60 in step 152. The pick sheet 64 assigns each of the SKUs (including the quantity of each SKU) from the order. The pick sheet 64 specifies how many pallets 22 will be necessary for that order (as determined by the DC computer 26). The DC computer 26 may also determine which SKUs should be loaded near one another on the same pallet 22, or if more than one pallet 22 will be required, which SKUs should be loaded together on the same pallet 22. For example, SKUs that go in the cooler may be together on the same pallet (or near one another on the same pallet), while SKUs that go on the shelf may be on another part of the pallet (or on another pallet, if there is more than one). If the pick sheet 64 is created on the DC computer 26, it is copied to the server 14. If it is created on the server 14, it is copied to the DC computer 26.

Figure 3:
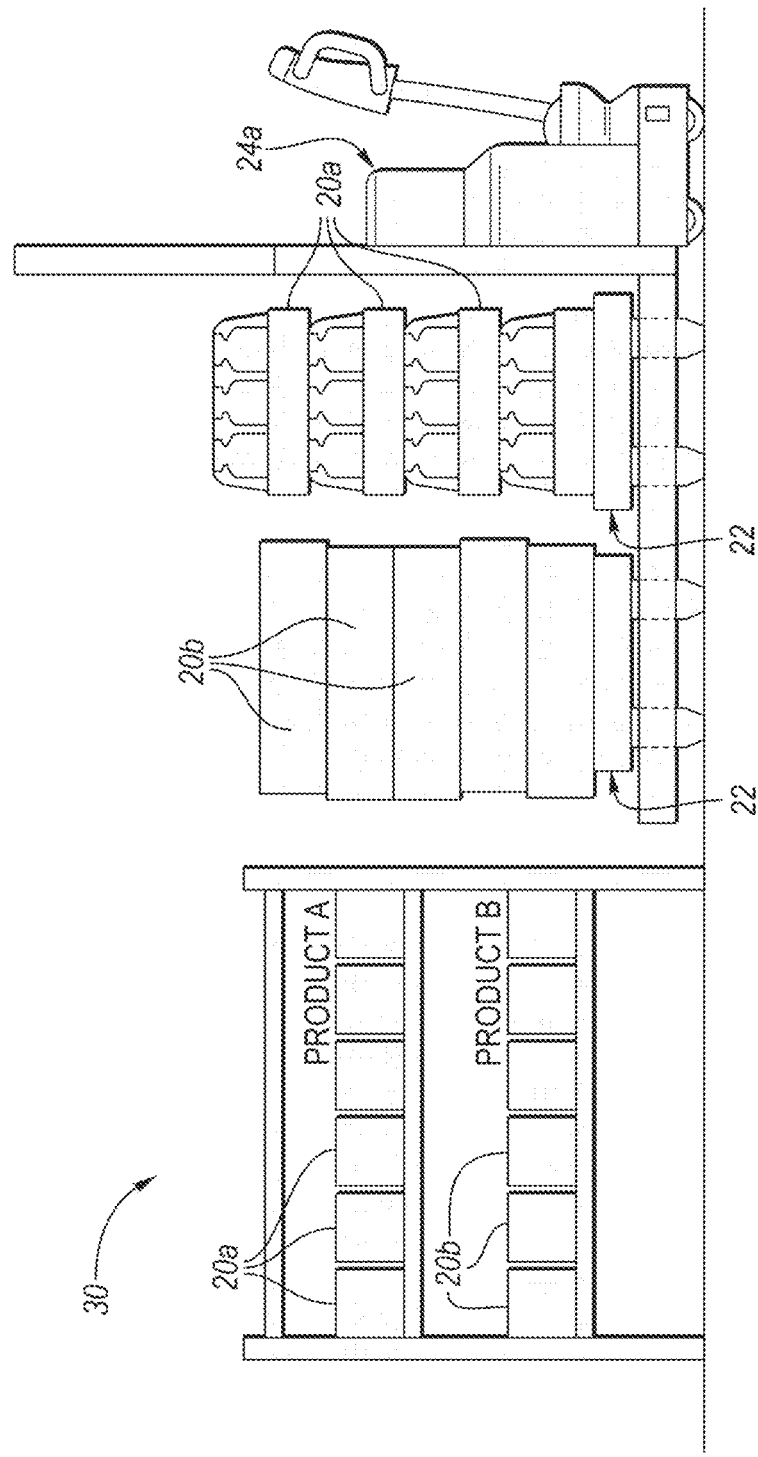
FIG. 3 shows an example loading station of the delivery system of FIG. 1.

FIG. 3 shows the pick station 30 of FIG. 1. Referring to FIGS. 1 and 3, workers at the distribution center read the palled id (e.g. via rfid, barcode, etc) on the pallet(s) 22 on a pallet jack 24a, such as with a mobile device or a reader on the pallet jack 24a. Shelves may contain a variety of items 20 for each SKU, such as first product 20a of a first SKU and a second product 20b of a second SKU (collectively "products 20"). A worker reading a computer screen or mobile device screen displaying from the pick sheet 64 retrieves each product 20 and places that product 20 on the pallet 22. Alternatively, the pallet 22 may be loaded by automated handling equipment.

Workers place items 20 on the pallets 22 according to the pick sheets 64, and report the palled ids to the DC computer 26 in step 154. The DC computer 26 dictates merchandizing groups and sub groups for loading items 20a, b on the pallets 22 in order to make unloading easier at the store. In the example shown, the pick sheets 64 dictate that products 20a are on one pallet 22 while products 20b are on another pallet 22. For example, cooler items should be grouped, and dry items should be grouped. Splitting of package groups is also minimized to make unloading easier. This makes pallets 22 more stable too.

After one pallet 22 is loaded, the next pallet 22 is brought to the pick station 30, until all of the SKUs required by the pick sheet 64 are loaded onto as many pallets 22 as required by that pick sheet 64. More pallets 22 are then loaded for the next pick sheet 64. The DC computer 26 records the pallet ids of the pallet(s) 22 that have been loaded with particular SKUs for each pick sheet 64. The pick sheet 64 may associate each pallet id with each SKU.

After being loaded, each loaded pallet 22 may be validated at the validation station 32, which may be adjacent to or part of the pick station 30. As will be described in more detail below, at least one still image, and preferably several still images or video, of the products 20 on the pallet 22 is taken at the validation station 32 in step 156. The pallet id of the pallet 22 is also read. The images are analyzed to determine the SKUS of the products 20 that are currently on the identified pallet 22 in step 158. The SKUs of the products 20 on the pallet 22 are compared to the pick sheet 64 by the DC computer 26 in step 160, to ensure that all the SKUs associated with the pallet id of the pallet 22 on the pick sheet 64 are present on the correct pallet 22, and that no additional SKUs are present. Several ways are of performing the aforementioned steps are disclosed below.

Figure 5:
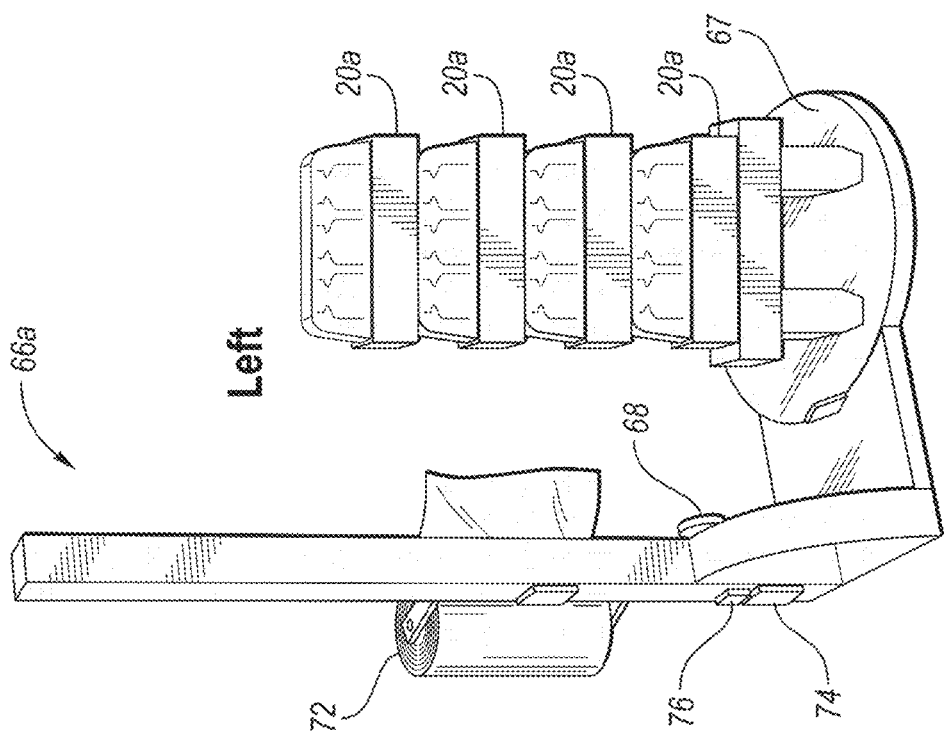
FIG. 5 is another view of the example validation system of FIG. 4 with a loaded pallet thereon.
Figure 4:
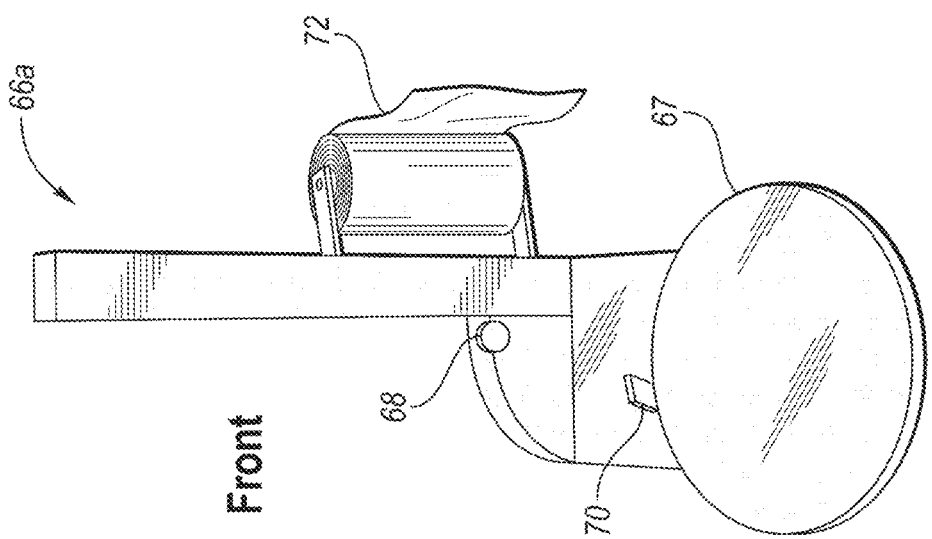
FIG. 4 shows an example validation station of the delivery system of FIG. 1.

First, referring to FIGS. 4 and 5, the validation station may include a CV/RFID semi-automated wrapper 66*a* with turntable 67 may be specially fitted with a camera 68 and rfid reader 70 (and/or barcode reader). The wrapper 66*a* holds a roll of translucent, flexible, plastic wrap or stretch wrap 72. As is known, a loaded pallet 22 can be placed on the turntable 67, which rotates the loaded pallet 22 as stretch wrap 72 is applied. The camera 68 may be a depth camera. In this wrapper 66*a*, the camera 68 takes at least one image of the loaded pallet 22 while the turntable 67 is rotating the loaded pallet 22, prior to or while wrapping the stretch wrap 72 around the loaded pallet 22. Images/video of the loaded pallet 22 after wrapping may also be generated. As used herein, "image" or "images" refers broadly to any combination of still images and/or video, and "imaging" means capturing any combination of still images and/or video. Again, preferably 2 to 4 still images, or video, are taken.

In one implementation, the turntable 67 is rotating and when the camera 68 detects that the two outer ends of the pallet 22 are equidistant (or otherwise that the side of the pallet 22 facing the camera 68 is perpendicular to the camera 68 view), the camera 68 records a still image. The camera 68 can record four still images in this manner, one of each side of the pallet 22.

The rfid reader 70 (or barcode reader, or the like) reads the pallet id (a unique serial number) from the pallet 22. The wrapper 66*a* includes a local computer 74 in communication with the camera 68 and rfid reader 70. The computer 74 can communicate with the DC computer 26 (and/or server 14) via a wireless network card 76. The image(s) and the pallet id are sent to the server 14 via the network card 76 and associated with the pick list 64 (FIG. 1). Optionally, a weight sensor can be added to the turntable 67 and the known total weight of the products 20 and pallet 22 can be compared to the measured weight on the turntable 67 for confirmation. An alert is generated if the total weight on the turntable 67 does not match the expected weight.

As an alternative, the turntable 67, camera 68, rfid reader 70, and computer 74 of FIGS. 4 and 5 can be used without the wrapper. The loaded pallet 22 can be placed on the turntable 67 for validation only and can be subsequently wrapped either manually or at another station.

Alternatively, the validation station can include a worker with a networked camera, such as on a mobile device (e.g. smartphone or tablet) for taking one or more images 62 of the loaded pallet 22, prior to wrapping the loaded pallet 22. Other ways can be used to gather images of the loaded pallet. In any of the methods, the image analysis and/or comparison to the pick list is performed on the DC computer 26, which has a copy of the machine learning models. Alternatively, the analysis and comparison can be done on the server 14, locally on a computer 74, or on the mobile device 78, or on another locally networked computer.

However the image(s) of the loaded pallet 22 are collected, the image(s) are then analyzed to determine the sku of every item 20 on the pallet 22 in step 158 (FIG. 2).

The computer vision-generated sku count for that specific pallet 22 is compared against the pick list 64 to ensure the pallet 22 is built correctly. This may be done prior to the loaded pallet 22 being wrapped thus preventing unwrapping of the pallet 22 to audit and correct. If the built pallet 22 does not match the pick list 64 (step 162), the missing or wrong SKUs are indicated to the worker (step 164). Then the worker can correct the items 20 on the pallet 22 (step 166) and reinitiate the validation (i.e. initiate new images in step 156). If the loaded pallet 22 is confirmed, positive feedback is given to the worker, who then continues wrapping the loaded pallet 22 (step 168). The worker then moves the validated loaded pallet 22 to the loading station 34 (step 172).

After the loaded pallet 22 has been validated, it is moved to a loading station 34 (FIG. 1). As explained in more detail below, at the loading station 34, the distribution center computer 26 ensures that the loaded pallets 22, as identified by each pallet id, are loaded onto the correct trucks 18 in the correct order. For example, pallets 22 that are to be delivered at the end of the route are loaded first.

Figure 6:
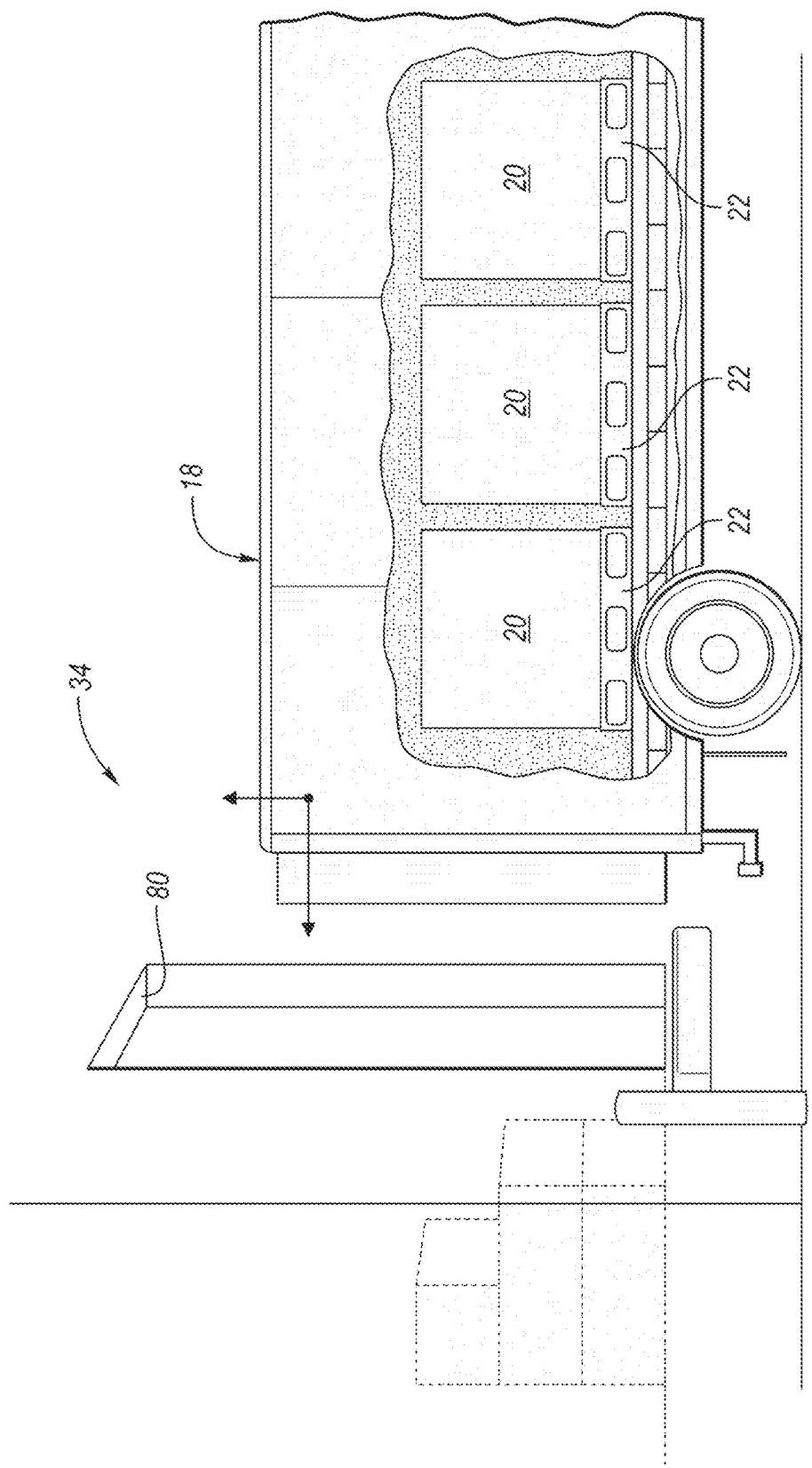
FIG. 6 shows an example loading station of the delivery system of FIG. 1.

Referring to FIGS. 1 and 6, a computer (DC computer 26, server 14, or another) determines efficient routes to be driven by each truck 18 to visit each store 16 in the most efficient sequence, the specific loaded pallets 22 that must go onto each truck 18, and the order in which the pallets 22 should be loaded onto the trucks 18. An optimized queue system is used to queue and load loaded pallets 22 onto the truck 18 in the correct reverse-stop sequence (last stop is loaded onto the truck 18 first) based upon the route planned for that truck 18. Each truck 18 will be at a different loading dock doorway 80. A list or database may indicate which pallets 22 are to be loaded into which trucks 82 and in which sequence.

Figure 7:
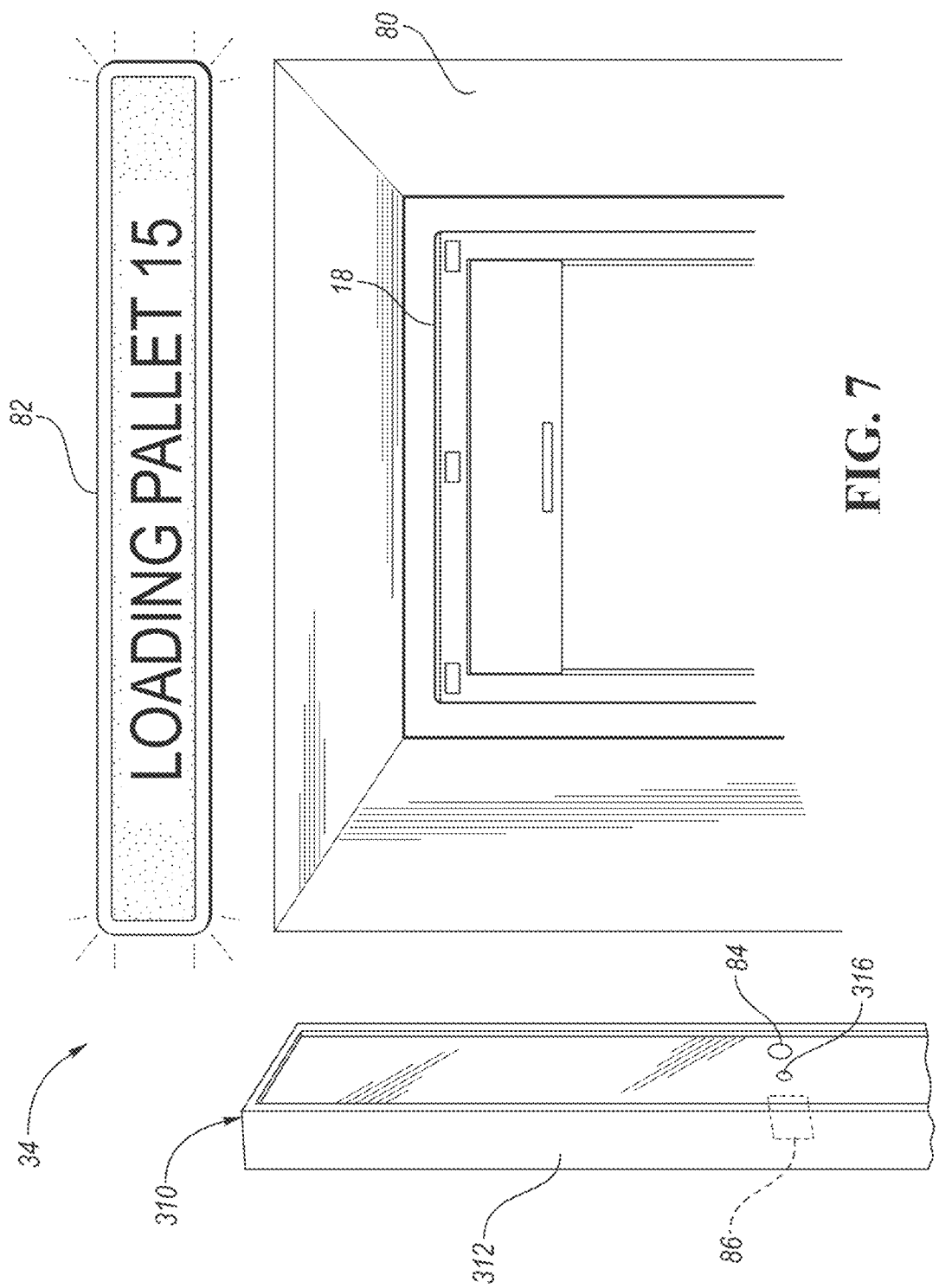
FIG. 7 is another view of the example loading station of FIG. 6.

FIG. 7 shows an example loading station 34, such as a loading dock with a doorway 80. Based upon the sequence determined by the server 14 or DC computer 26 or other computer, an electronic visual display 82 proximate the doorway 80 shows which pallet 22 is to be loaded onto that truck 18 next. A sensor tower 310 having a housing 312 is mounted adjacent the doorway 80. A presence sensor 316 may be mounted to the housing 312. The sensor tower 310 may further include a camera 84 and/or rfid reader 86 adjacent the doorway 80. After being triggered by the presence sensor 316, the camera 84 and/or the rfid reader 86 image/read each loaded pallet 22 as it is being loaded onto the truck 18. The pallet 22 may be identified by the pallet id and/or based upon the products on the pallet as shown in the image. The computer compares that identified pallet 22 to the previously-determined lists.

If the wrong pallet 22 is moved through (or toward) the doorway 80, an audible and/or visual alarm alerts the workers. Optionally, the rfid reader 86 at the doorway 80 is able to determine the direction of movement of the rfid tag on the loaded pallet 22, i.e. it can determine if the loaded pallet 22 is being moved onto the truck 18 or off of the truck 18. This is helpful if the wrong loaded pallet 22 is moved onto the truck 18. The worker is notified that the wrong pallet 22 was loaded, and the rfid reader 86 can confirm that the pallet was then moved back off the truck 18.

When a group of loaded pallets 22 (two or more) is going to the same store 16, the loaded pallets 22 within this group can be loaded onto the truck 18 in any order. The display 82 may indicate the group of loaded pallets 22 and the loaded pallets 22 within this group going to the same store 16 will be approved by the rfid reader 86 and display 82 in any order within the group.

Figure 8:
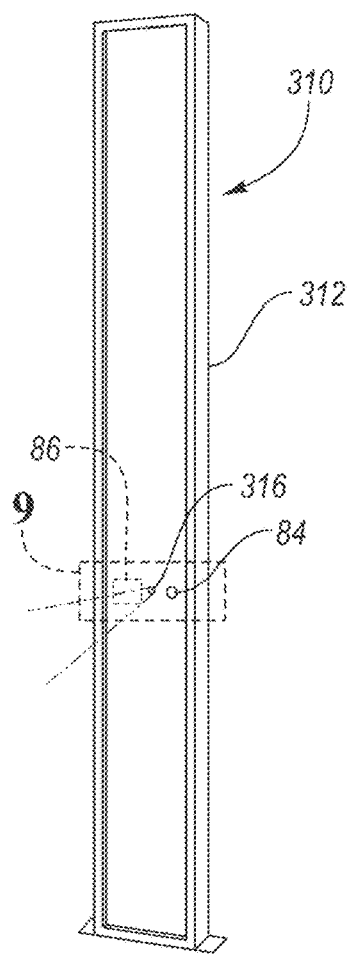
FIG. 8 illustrates a sensor tower at the loading dock of FIG. 7.
Figure 9:
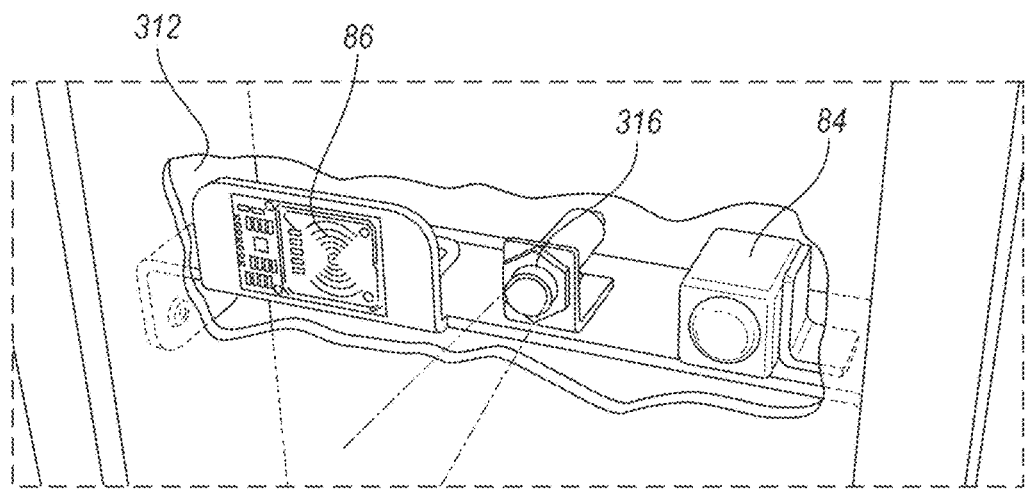
FIG. 9 shows a portion of the sensor tower of FIG. 8 partially broken away.

FIG. 8 shows the sensor tower 310 that could be used, for example, at the doorway 80 at the loading dock of FIG. 7. FIG. 9 shows a portion of the sensor tower 310, partially broken away. The sensor tower 310 includes the housing 312 supporting above the floor the RFID reader 86 (which could be a UHF RFID reader), the presence sensor such as a break beam sensor 316, and the camera 84 (which could be a depth camera, as above). The RFID reader 86, break beam sensor 316, and camera 84 may all be controlled by the DC computer 26. Alternatively, a local computer (e.g. in the tower 310) is programmed to control the operation of these devices and to communicate with the DC computer 26.

Figure 10:
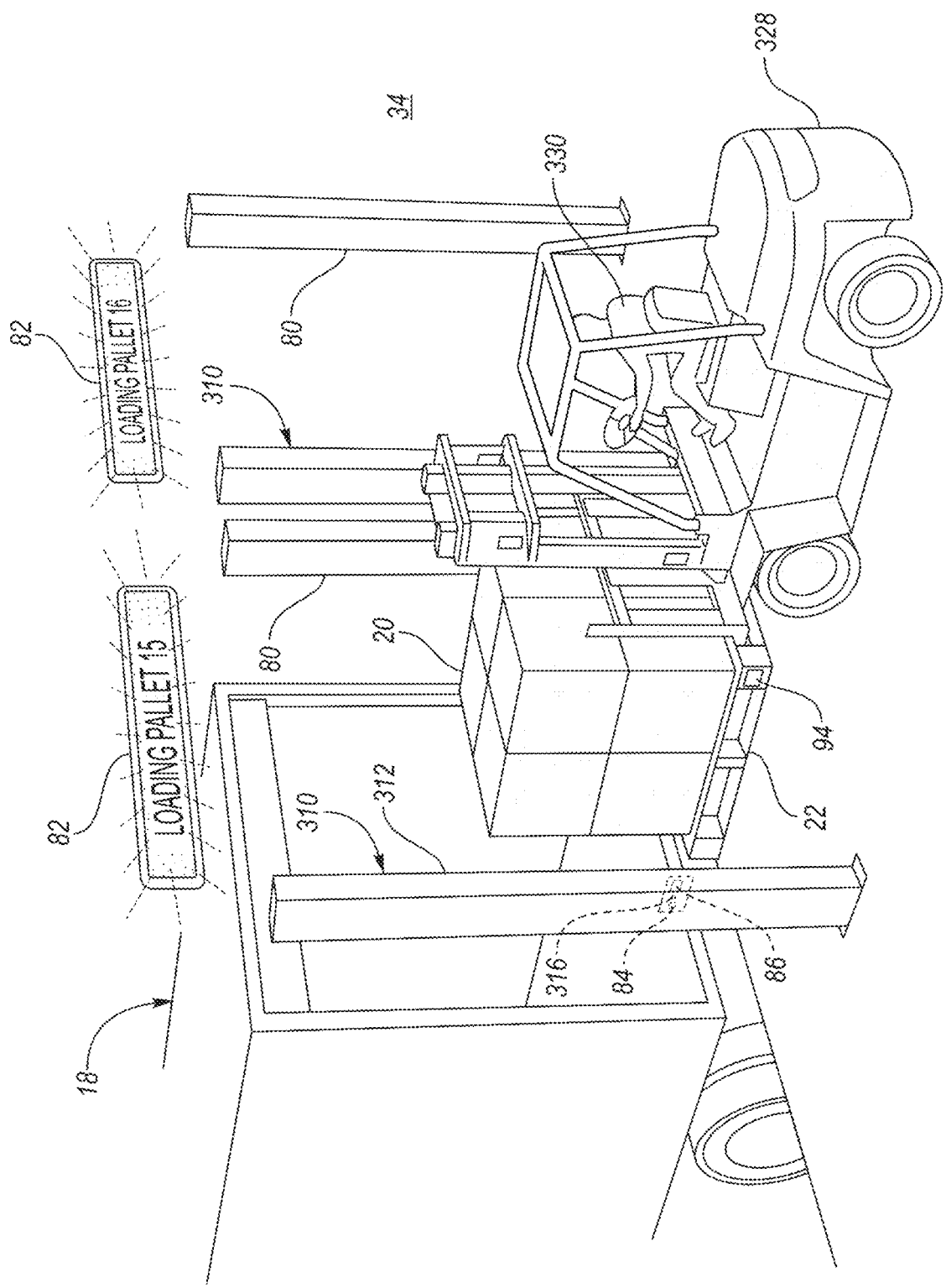
FIG. 10 shows a sensor tower positioned adjacent each doorway and a loaded pallet being brought toward the doorway.

As shown in FIG. 10, the sensor tower 310 is positioned adjacent each doorway 80 at each loading station 34, with the RFID reader 86, break beam sensor 316 (which could be photo optic), and camera 84 all directed toward the doorway 80. The sensor tower 310 could also be mounted at any entrance or exit or any point where tracking asset moves would be beneficial. The display 82 is mounted near the doorway 80, such as above the doorway 80.

As also shown in FIG. 10, a forklift 328 (or pallet jack or pallet sled or any machine for lifting and moving pallets) operated by an operator 330, is moving a pallet 22 having an RFID tag 94. The pallet 22 is loaded with products 20. As the loaded pallet 22 is moved through the doorway 80, it passes in front of the sensor tower 310.

Figure 11A:
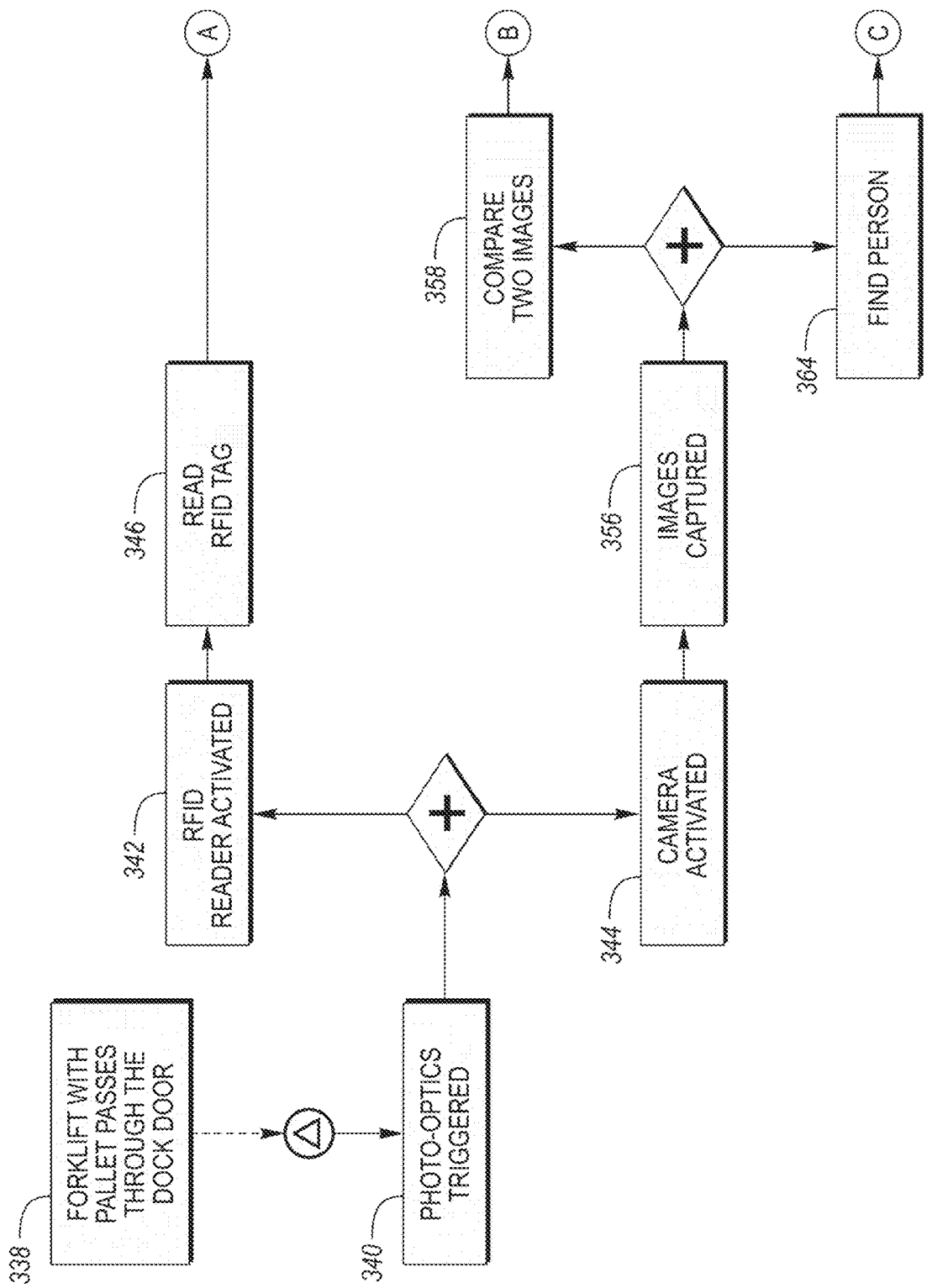
FIGS. 11A and 11B show a flowchart for the operation of the sensor tower.
Figure 11B:
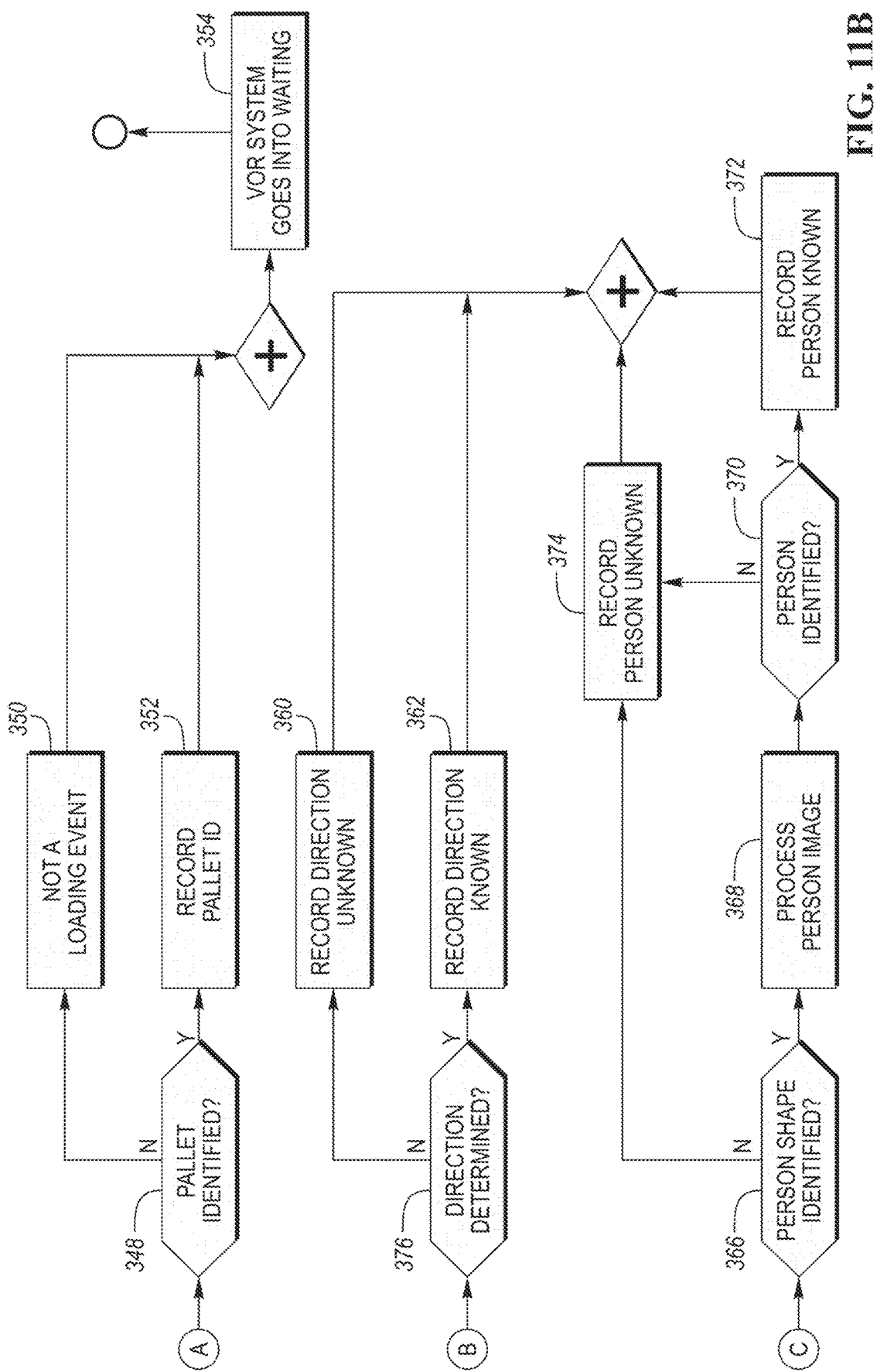
Figure 13:
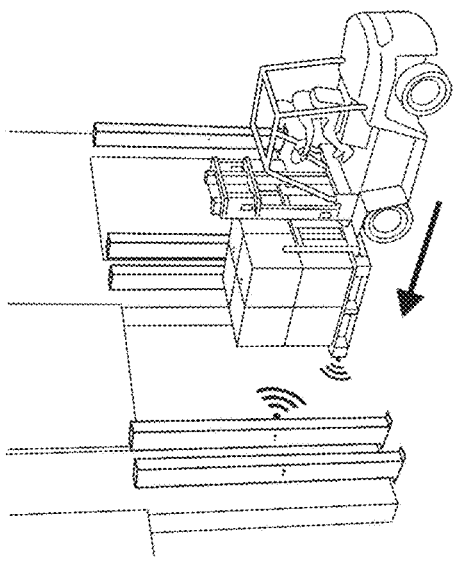
FIG. 13 shows the RFID reader detecting a tag.
Figure 12:
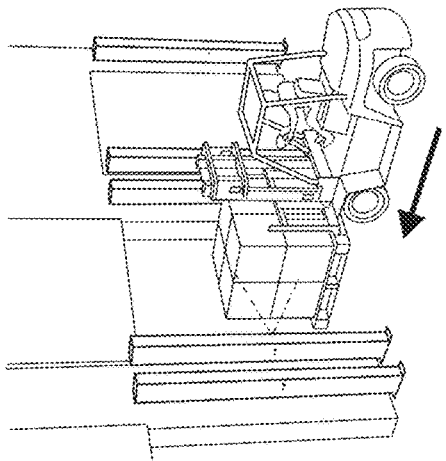
FIG. 12 shows break beam sensors detecting an outbound loaded pallet.

The computer, such as the DC computer 26, the server 14, or a dedicated local computer (or some combination thereof) is programmed to perform the steps shown FIGS. 11A and 11B. Referring to FIG. 11A and FIG. 12, the loaded pallet 22 passes through the doorway 80 (or as it approaches the doorway 80), the break beam sensor 316 detects presence in step 340, the RFID reader 86 and the camera 84 are activated in steps 342 and 344, respectively. If the RFID reader 86 detects a tag 94 (FIGS. 11A and 13), the tag 94 is read in step 346 and checked against known tags. If the tag 94 is identified in the system in step 348, it is recorded in step 352. If the tag 94 is not identified, it is determined that there is no loading event in step 350. For example, maybe a person or equipment passed in front of the break beam sensor 316 without a pallet 22.

Figure 14:
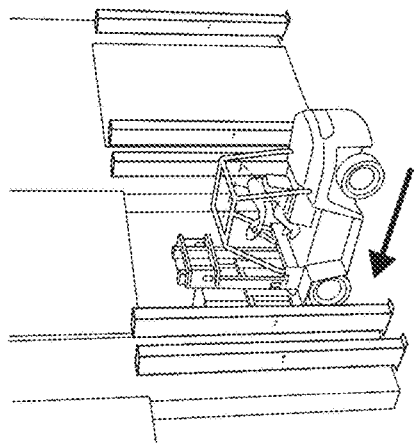
FIG. 14 shows the camera capturing an image.

Simultaneously with step 342, the camera 84 will start capturing images in step 356 (FIGS. 11A and 14). Two images taken at some short time interval apart (e.g. 1 second or less) are compared in step 358. Based upon the comparison of the two images, the direction of movement of the pallet 22, goods 20, and/or the lift 438 can be determined (such as by the DC computer, server, or local computer. It can also be determined by the computer whether the driver/operator 330 is in the image(s) in steps 364, 366. Referring to FIG. 11B, a person shape image within the image is identified in step 366. The person image is processed in step 368, e.g. via facial recognition. Alternatively, or additionally, the person may also have an RFID tag that can be read by the RFID reader 86. If a person is identified in step 370, then the known person is recorded in step 372. If not, then "person unknown" is recorded in step 374. The system may ensure that the person identified is authorized to be in that area and to handle those products. If the person is unknown or unauthorized, the system may sound an alarm and/or generate another alert.

In step 358, the two (or more) images are compared. Based upon this comparison, it is determined whether a direction can be determined in step 376. If so, the direction of the movement is recorded in step 362. If not, then "direction unknown" is recorded in step 360. The system goes into waiting in step 354.

Figure 15:
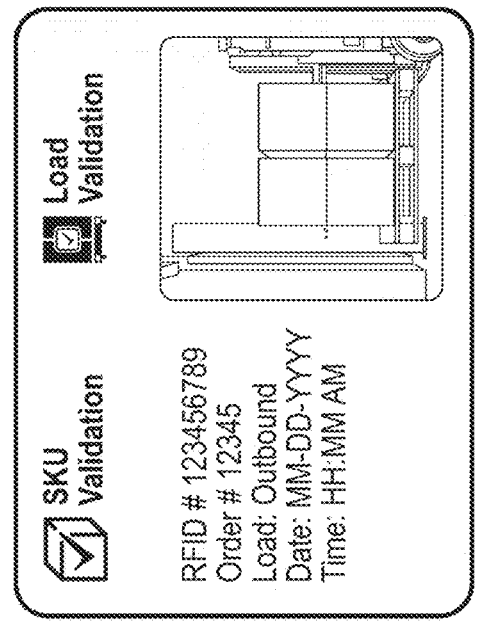
FIG. 15 illustrates the camera capturing images for the SKU validation and the load validation.

Referring to the example in FIG. 15, the system has determined the direction (outbound, i.e. onto the truck), the date/time, the RFID of the pallet 22. The system may optionally also validate the load based upon the image(s) taken of the loaded pallet 22 (using the techniques described above but with the image(s) from the camera 84). In other words, the image(s) taken by the camera 84 could also operate as the validation station 32 described above, either instead of the validation station 32 or in supplement to the validation station 32. These images could be used to identify the products on the pallet 22. Alternatively, the image of the loaded pallet 22 could be compared by one of the computers to one or more of the images of the same loaded pallet 22 at the validation station 32 to make sure that there have been no changes (nothing has been removed or added). This could be done with or without specifically identifying every item on the pallet 22, e.g. just comparing the two images as a whole.

With the loaded pallet 22 identified by pallet RFID, and the direction (loading or unloading determined), the system can determine that the particular pallet 22 is being loaded onto a correct truck or an incorrect truck based upon the loading assignments previously determined as described above. The system also determines whether the particular pallet 22 is being loaded in the correct or incorrect sequence by comparing it to the previously-determined loading sequence described above. If the pallet 22 is being loaded onto the wrong truck, or out of sequence, an alert would be generated (visually such as via display 82 and/or audibly). The system can then verify that the same pallet 22 is subsequently unloaded from that truck based upon a determination that the pallet 22 is moved in the direction off the truck.

FIGS. 16-18 show the system operating with respect to an inbound loaded pallet 22. In FIG. 16, the breakbeam sensor 316 is triggered. In FIG. 17, the rfid signal tag 94 is recorded by the RID reader 314. In FIG. 18, the camera 84 takes a photo of the loaded pallet 22 and/or the driver/operator.

In FIG. 19 the system has determined that the loaded pallet was inbound, the date/time, the pallet id, and the identification of the operator.

Additional features for post processing can be implemented after events are recorded. Visual indicators can affirm or deny accuracy of asset movement. Additional audible alarms can be generated in cases where operator alerting is urgent or critical Email/text alerts can be sent with photos of threshold events (e.g. a high value asset being loaded on to incorrect truck). Shipment claim processing can also be supported, such as photographic verification items left warehouse.

In accordance with the provisions of the patent statutes and jurisprudence, exemplary configurations described above are considered to represent preferred embodiments of the inventions. However, it should be noted that the inventions can be practiced otherwise than as specifically illustrated and described without departing from its spirit or scope. Alphanumeric identifiers on method steps are solely for ease in reference in dependent claims and such identifiers by themselves do not signify a required sequence of performance, unless otherwise explicitly specified.

What is claimed is:

1. A delivery portal through which a pallet loaded with items can pass, the delivery portal comprising:
   a sensor tower including a camera configured to image the items on the pallet when the pallet is adjacent the sensor tower; and
   a computer storing at least one machine learning model and programmed to identify a SKU associated with each of the items on the pallet based upon at least one image from the camera using the at least one machine learning model, wherein the computer is programmed to compare the identified SKUs of the items on the pallet to a pick sheet and to indicate any missing SKUs based upon the comparison.

2. The delivery portal of claim 1 wherein the delivery portal is a loading dock.

3. The delivery portal of claim 1 wherein the computer is programmed to identify a person moving the pallet through the delivery portal based upon an image from the camera.

4. The delivery portal of claim 1 wherein the computer is programmed to determine a direction of travel of the pallet through the delivery portal based upon information from the camera.

5. The delivery portal of claim 4 wherein the computer determines the direction of travel based upon a plurality of images from the camera.

6. The delivery portal of claim 1 further including a presence sensor, wherein the computer is programmed to activate the camera based upon information from the presence sensor.

7. The delivery portal of claim 6 wherein the presence sensor is a breakbeam sensor.

8. The delivery portal of claim 1 wherein the delivery portal is configured to permit a forklift, a pallet jack, or a pallet sled to pass therethrough.

9. The delivery portal of claim 1 wherein the items are containers of cans or bottles.

10. The delivery portal of claim 9 wherein the pick sheet indicates a desired quantity of each of a plurality of SKUs.

11. A delivery portal sensor tower comprising:
a housing at least partially defining a portal through which a loaded pallet can pass;
a camera mounted to the housing; and
a computer in communication with the camera, wherein the computer is programmed to identify a SKU associated with each of a plurality of items stacked on a pallet based upon at least one image captured by the camera, wherein the computer is programmed to compare the identified SKUs of the items on the pallet to a pick list and to indicate any missing SKUs based upon the comparison.

12. The delivery portal sensor tower of claim 11 wherein the portal is configured to receive a forklift carrying the loaded pallet therethrough.

13. The delivery portal sensor tower of claim 12 further including a presence sensor, wherein the computer is programmed to cause the camera to capture at least one image based upon an indication of presence by the presence sensor.

14. The delivery portal sensor tower of claim 12 wherein the computer is programmed to identify a person moving the loaded pallet through the portal based upon an image from the camera.

15. The delivery portal sensor tower of claim 12 wherein the computer is programmed to determine a direction of travel of the loaded pallet through the portal based upon information from the camera.

16. A portal sensor tower comprising:
a housing at least partially defining a portal through which a loaded pallet can pass;
a camera mounted to the housing; and
a computer in communication with the camera, wherein the computer is programmed to determine a direction of travel of the loaded pallet through the portal based upon a plurality of images from the camera;
wherein the portal is configured to receive a pallet jack carrying the loaded pallet therethrough.

17. The portal sensor tower of claim 16 further including an RFID reader configured to read an RFID tag on the loaded pallet passing through the portal, wherein the computer is programmed to determine whether the loaded pallet should be passing through the portal based upon the RFID tag and based upon the direction of travel of the loaded pallet.

18. The portal sensor tower of claim 17 wherein the computer is programmed to generate a notification if the computer determines that the loaded pallet passed through the portal and should not have passed through the portal and wherein the computer is programmed to determine that the loaded pallet is subsequently moved back through the portal based upon a subsequent direction of travel of the loaded pallet.

19. A computerized method for operating a portal including:
a) imaging a plurality of items stacked on a platform proximate the portal;
b) receiving at least one image of the plurality of items in at least one computer;
c) the at least one computer identifying SKUs associated with each of the plurality of items on the platform based upon the at least one image; and
d) the at least one computer comparing the identified SKUs associated with the plurality of items to a pick sheet.

20. The computerized method of claim 19 further including:
imaging a person moving the platform and the at least one computer identifying the person moving the platform.

21. The computerized method of claim 19 further including determining a direction of movement of the platform relative to the portal based upon information from a camera.

22. A computerized method for operating a portal including:
a) detecting a presence of a person moving a plurality of items on a platform proximate a portal or the presence of the plurality of items on the platform proximate the portal;
b) capturing at least one image of the person in at least one computer based upon step a);
c) the at least one computer identifying the person based upon the at least one image;
d) the at least one computer receiving an identification of the platform;
e) the at least one computer associating the identified platform with the identified person;
f) the at least one computer identifying SKUs of the plurality of items on the platform; and
g) the at least one computer comparing the identified SKUs of the plurality of items to pick sheet.

23. The computerized method of claim 22 further including determining a direction of movement of the platform relative to the portal based upon a plurality of images.

24. A computerized method for operating a portal including:
a) detecting a presence of a person moving a plurality of items on a platform proximate a portal or the presence of the plurality of items on the platform proximate the portal;
b) capturing at least one image of the person in at least one computer based upon step a);
c) the at least one computer identifying the person based upon the at least one image;
d) the at least one computer receiving an identification of the platform;
e) the at least one computer associating the identified platform with the identified person;
f) the computer determining that the person identified in step e) is not authorized to handle the platform identified in step d); and
g) indicating an alert or alarm based upon the determination in step f).

* * * * *